United States Patent [19]

Hjelm

[11] Patent Number: 4,597,472
[45] Date of Patent: Jul. 1, 1986

[54] SCAFFOLDING SYSTEM

[76] Inventor: Bo A. Hjelm, Älgvägen 35, S-302 70 Halmstad, Sweden

[21] Appl. No.: 567,866
[22] PCT Filed: Apr. 22, 1983
[86] PCT No.: PCT/SE83/00154
  § 371 Date: Dec. 9, 1983
  § 102(e) Date: Dec. 9, 1983
[87] PCT Pub. No.: WO83/03868
  PCT Pub. Date: Nov. 10, 1983

[30] Foreign Application Priority Data

Apr. 22, 1982 [SE] Sweden .................. 82025180

[51] Int. Cl.⁴ ........................................ E04G 1/06
[52] U.S. Cl. .................................. 182/178; 182/179; 403/255; 403/348
[58] Field of Search ............... 182/178, 179; 403/409, 403/49, 255, 254, 252, 348, 316, 317, 325; 52/637

[56] References Cited

U.S. PATENT DOCUMENTS

| | | | |
|---|---|---|---|
| 3,330,583 | 7/1967 | Kennedy | 182/179 |
| 3,527,320 | 9/1970 | Cunningham | 182/178 |
| 3,867,048 | 2/1975 | Endzweig | 403/255 |
| 4,133,433 | 1/1979 | Wolf | 403/255 |
| 4,140,414 | 2/1979 | Buttgeveit | 403/409 |
| 4,334,797 | 6/1982 | Wahlin | 403/252 |

FOREIGN PATENT DOCUMENTS

2624273  8/1977  Fed. Rep. of Germany ...... 403/255

Primary Examiner—Reinaldo P. Machado
Assistant Examiner—Alvin Chin-Shue
Attorney, Agent, or Firm—Barnes, Kisselle, Raisch, Choate, Whittemore & Hulbert

[57] ABSTRACT

A scaffolding system comprises tubular uprights (10) having inwardly extending stiffening and guide flanges (23) for guiding any inserted jointing pieces and braces (15) that may be necessary, and connected with connecting beams (12) by means of bayonet joints (21, 22, 33). Such a bayonet joint comprises a hole (21) in the upright (10) and a locking hook (22) which projects from the end of the beam (12) and which, after it has been turned into its engagement position, is fixed in this position by means of a catch (35) displaceably mounted on the beam for movement into locking engagement with the upright. The inwardly extending stiffening flanges in the tubular uprights have radial recesses provided at a predetermined distance from the ends of the uprights to receive outwardly directed projections on a jointing piece insertable in the uprights.

7 Claims, 20 Drawing Figures

SCAFFOLDING SYSTEM

The present invention relates to a scaffolding system for use in, for example, the building industry, and comprises tubular uprights, jointing pieces and braces which, if necessary, can be inserted in said uprights, connecting beams and ties for said uprights, and fastening means for interconnecting said uprights and connecting beams.

Such systems are used by the building industry as scaffoldings or as components in shuttering systems which, with relatively few standard components, make for the erection of scaffoldings or formwork for casting concrete walls and decks.

Prior art scaffolding systems usually comprise uprights of conventional steel tubing which, if desired, are provided with externally secured yoke-shaped fasteners or formed with holes in the tube walls for the insertion of locking hooks upon mounting of connecting beams and ties for the uprights. Even though, in some cases, the steel has been replaced by less heavy material, such as aluminium, in some prior art scaffolding systems, the components of the scaffolding systems have been formed in the manner usually employed for steel scaffoldings.

An example of a known scaffolding system is disclosed by German Auslegeschrift DE-B2No. 2,237,490 and comprises U-shaped uprights with keyhole-like holes for the insertion of locking hooks at the ends of the connecting beams of the system. These locking hooks are displaceably mounted in the connecting beams and can be clamped in desired position by means of a tension bolt. Such scaffolding systems suffer from many disadvantages; among other things, the mounting takes time because all tension bolts must be tightened, and furthermore the bolts may come loose during use so that the stability of the scaffolding is jeopardised.

The present invention aims at providing an even more rational and economical scaffolding system than prior art scaffolding systems of steel or other material. In short, the present invention thus provides a scaffolding system which comprises tubular uprights having inwardly extending stiffening and guide flanges for guiding such inserted jointing pieces and braces as may be required, and are connected with connecting beams by means of bayonet joints. A bayonet joint of this type has a hole in the upright and a locking hook which extends from the end of the connecting beam and, which, after it has been turned into its engagement position, is fixed in this position by means of catch displaceably mounted on the connecting beam for movement into locking engagement with said upright. The inwardly extending stiffening flanges in the tubular uprights may have radial recesses disposed at a predetermined distance from the ends of the uprights to receive outwardly extending projections on a jointing piece insertable into the uprights.

A scaffolding system according to the invention comprises tubular uprights, jointing pieces and braces which, if necessary, can be inserted into said uprights, connecting beams and ties for the uprights, and fastening means for interconnecting the uprights and the connecting beams. According to the invention, such a scaffolding system is characterised in that the uprights are in the form of tubes with holes in the tube wall for insertion of a locking hook comprised by the fastening means, and with inwardly projecting stiffening and guide flanges extending over the entire length of the uprights and adapted to guide any jointing pieces and braces inserted in the tube, while maintaining between the tube wall and any jointing pieces and braces inserted in the tube a spacing which is sufficient for accommodating that part of the locking hook which projects into the tube.

A preferred embodiment of the system according to the present invention is characterised in that the fastening means for interconnecting uprights and stringers are in the form of bayonet joints and each comprise one of the holes in the upright, the locking hook secured to the end of the connecting beam and rotatable together therewith, and a catch which is displaceably mounted at the connecting beam end and is adapted, after the connecting beam and the upright have been interconnected, to be moved into locking engagement with said, upright to prevent rotation of the connecting beam relative to the upright.

In a further preferred embodiment, the locking hook projecting from the connecting beam is provided with shoulders for engagement both with the inner side and the outer side of the wall portion of the uprights adjacent the holes of the bayonet joints, thereby providing for increased stability of the scaffolding system in that the locking hooks, after the system has been mounted, are unable to move either inwardly or outwardly relative to the wall of the upright.

In another preferred embodiment of the system, connecting beams can be mounted between uprights which are fixedly mounted at a predetermined distance from one another. This embodiment is characterised in that the connecting beam has, at least at one end, an end portion which is so formed that the locking hook, when the bayonet joint is closed, can be moved further into the hole in the upright than is necessary for bayonet engagement, as well as a supporting portion which is adapted, after the connecting beam and the locking hook have been rotated into bayonet engagement, to rest against the upright in order to maintain the engagement. The supporting portion at the end of the connecting beam preferably is in the form of a supporting lug affixed to the connecting beam and projecting from the end portion thereof, thereby to facilitate production of the connecting beams.

A number of embodiments of the scaffolding system according to the present invention will be described in the following, reference being had to the accompanying drawings.

Figure 1:
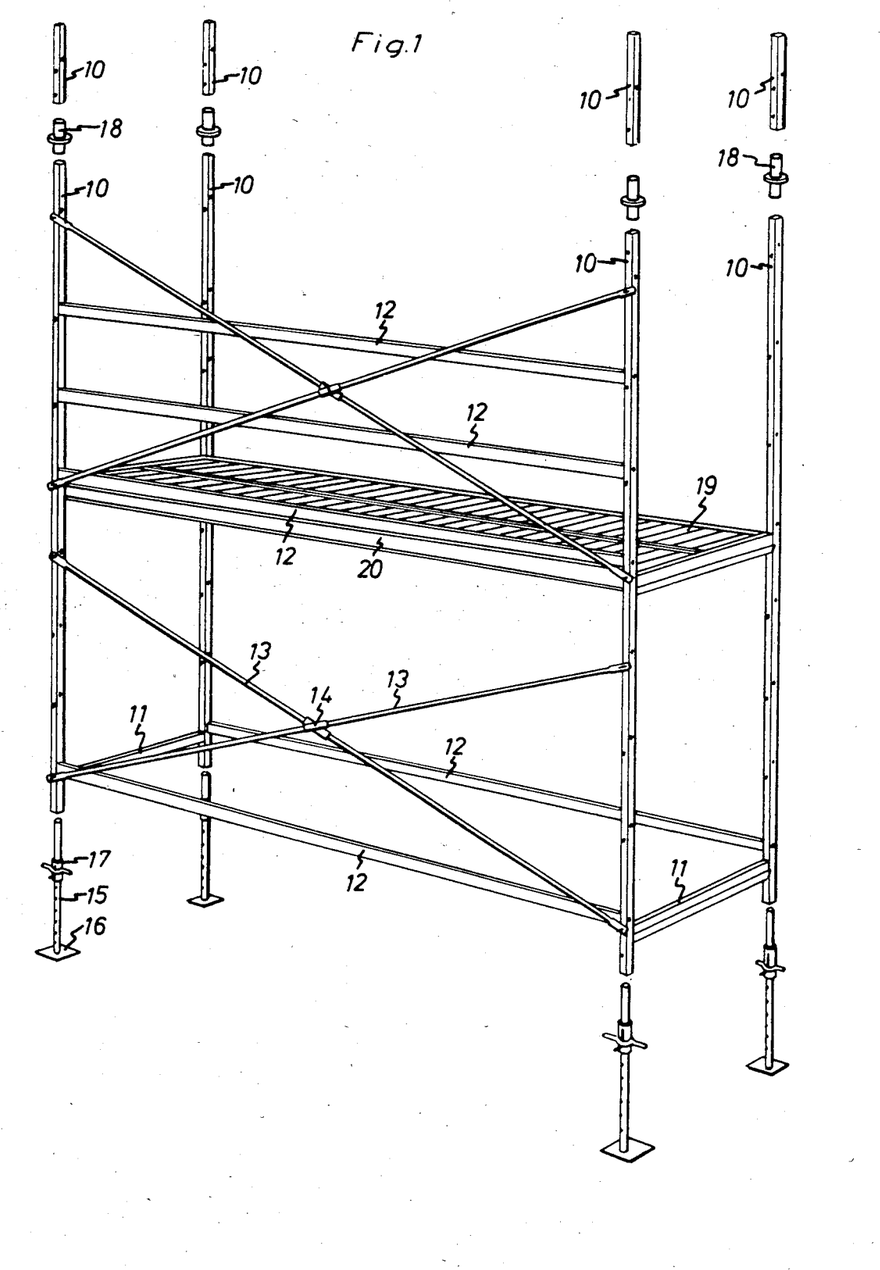
FIG. 1 is a perspective and partly exploded view of part of an embodiment of the scaffolding system according to the invention.

The embodiment, illustrated in FIG. 1, of the scaffolding system according to the invention comprises uprights 10 and interconnecting cross-beams 11 and connecting beams 12. Furthermore, there are provided ties 13 which, in the embodiment illustrated, are interconnected by means of a joint 14 to form cross-ties. The scaffolding system also comprises braces 15 with footplates 16 and screws 17 for vertical adjustment. Furthermore, the system comprises jointing sleeves 18 which are shown in detail in FIGS. 4 and 5. In the embodiment illustrated, a catwalk 19 is mounted in the scaffolding system. The catwalk has lateral section bars 20.

Figure 2:
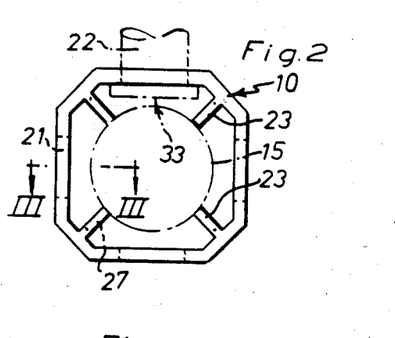
FIG. 2 is an end view of an upright comprised by the scaffolding system.

According to the invention, the uprights 10 are formed (see FIGS. 2 and 3) as tubes with holes 21 in the tube wall for the insertion of the locking hooks 22 of the fastening means (a detailed description is given below). According to the invention, the uprights furthermore are provided with inwardly projecting stiffening and guide flanges 23 extending over the entire length of the uprights. Besides their stiffening effect (whereby the upright can be made of aluminium without jeopardising the buckling strength of the upright), these flanges serve to guide jointing pieces 18 and braces 15 inserted in the uprights, to hold these members at a distance from the tube wall such that the locking hooks 22 of the fastening means find enough room. In the embodiment illustrated, the upright is of octagonal cross-section, but other polygonal cross-sectional areas are conceivable, as long as care is taken that the stiffening and guide flanges will provide enough room for the locking hooks inserted in the upright. By designing the uprights in this manner, with inwardly projecting flanges, the laborious arrangements frequently encountered in steel scaffolding systems could be avoided.

Figure 3:
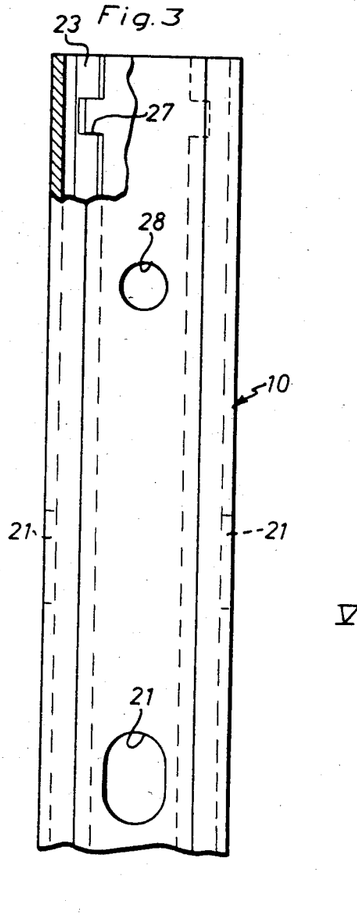
FIG. 3 is a lateral view, partly in section along line III—III in FIG. 2, of the upright shown in FIG. 2.
Figure 4:
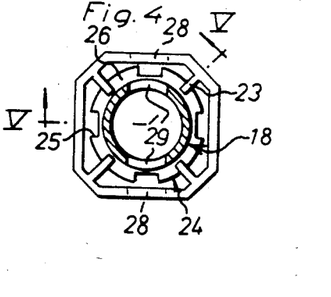
FIG. 4 is an end view of an upright with a jointing piece which is inserted therein and which is shown in section along line IV—IV in FIG. 5.
Figure 5:
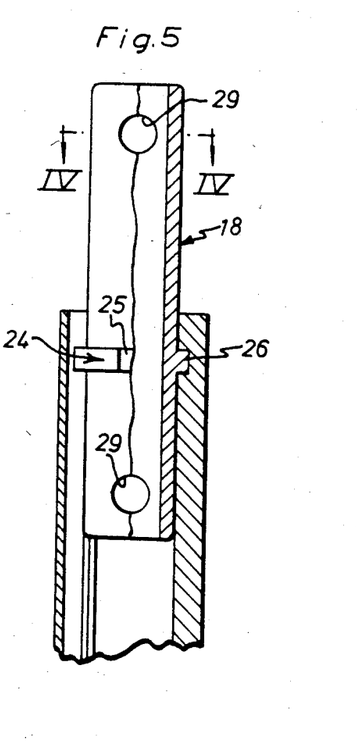
FIG. 5 is a section along line V—V in FIG. 4.
Figure 6:
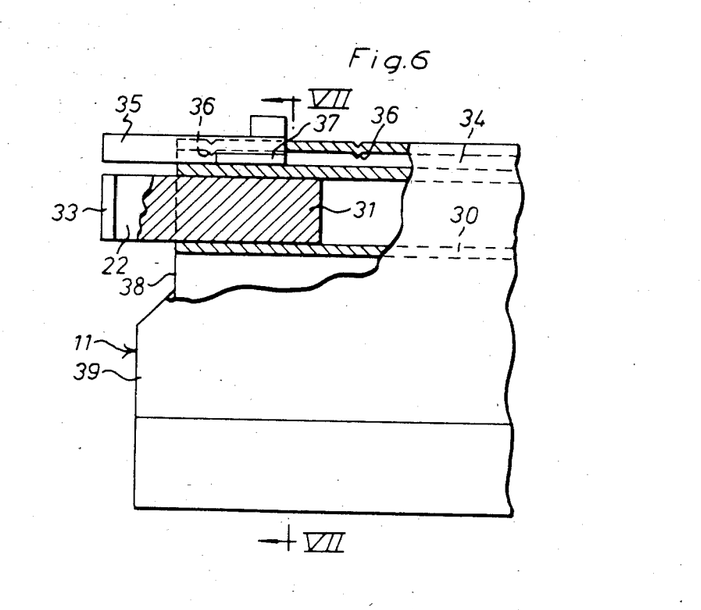
FIG. 6 shows, partly in section, the end of a cross-beam comprised by the scaffolding system.

As will appear from FIGS. 3-5, the uprights of the scaffolding system can be interconnected extremely rationally in the longitudinal direction in that the jointing pieces 18 are guided by the inwardly directed flanges 23 and can be moved into bayonet engagement with these flanges 23 by providing the jointing piece 18 with an external flange 24 with recesses 25 dividing the flange into a number of projections 26 engaging with recesses 27 formed in the inwardly directed flanges 23 at a predetermined distance from the end of the upright. After turning the jointing piece into the position illustrated in FIGS. 4 and 5, a locking pin (not shown) can be inserted through holes 28 in the upright and a hole 29 provided in the jointing piece 18 and located opposite said holes 28. Manufacture of this jointing arrangement is simple and does not weaken the uprights at the joints. In view hereof, the jointing arrangement is better than those illustrated in, for example, Austrian patent specification AT-B No. 330,438, French patent publication FR-A1 No. 2,449,763 and PCT publication WO No. 82/02919.

The scaffolding system according to the present invention also comprises connection means for interconnecting uprights and connecting beams. In the preferred embodiment of the invention, these connection means are formed as bayonet joints and will be described in the following with reference to FIGS. 6–10. The bayonet joints comprise the holes 21 in the uprights 10 and the locking hook 22 which is mounted at the ends of the cross-beams 11 and the connecting beams 12.

Figure 7:
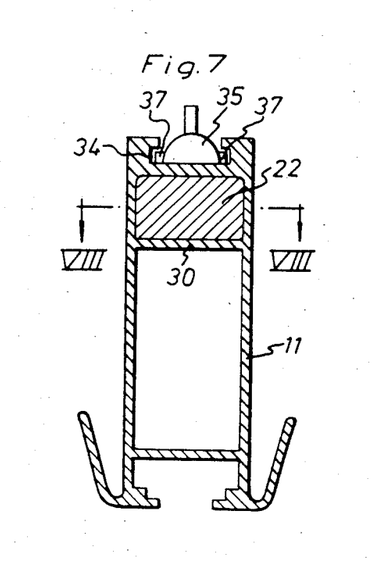
FIG. 7 is a section along line VII—VII in FIG. 6.
Figure 8:
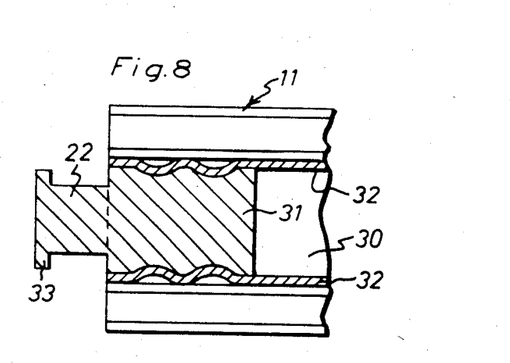
FIG. 8 is a section along line VIII—VIII in FIG. 7.

As will appear from, for example, FIG. 7 the cross-beams 11 are in the form of a box beam having an inner partition 30 for defining a space in which the mounting part 31 of the locking hook is inserted. The mounting part has been formed with corrugations on opposite sides so that it can be secured in the beam by deformation of the side walls 32 of the beam into engagement with the mounting part 31. The outer end of the locking hook 22 carries an outwardly directed flange 33 which, in the embodiment illustrated, is oval to correspond to the shape of the oval hole 21 in the upright. The upper part of the cross-beam 11 has an undercut groove 34 in which a catch 35 is displaceably mounted. The movements of the catch along the groove 34 are restricted by inwardly upset stops 36 cooperating with flanges 37 on the catch. Thus, the catch can be displaced between the two end positions shown in FIGS. 9 and 10. The same arrangement of locking hook and catch, is utilised for the connecting beams 12.

Figure 9:
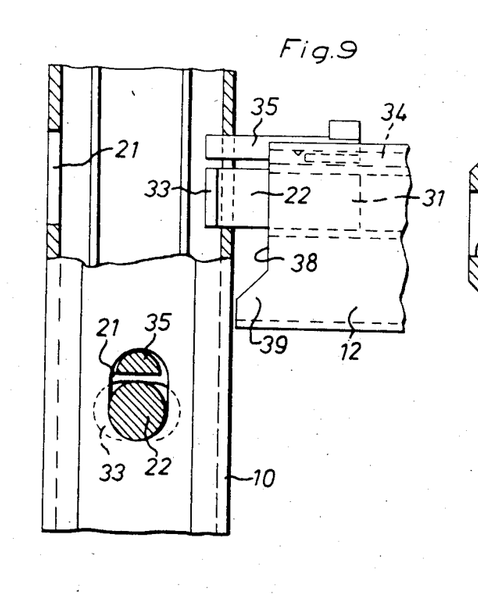
FIG. 9 is, partly in section, a lateral view of a part of an upright and a connecting beam and cross-beam connected therewith.
Figure 10:
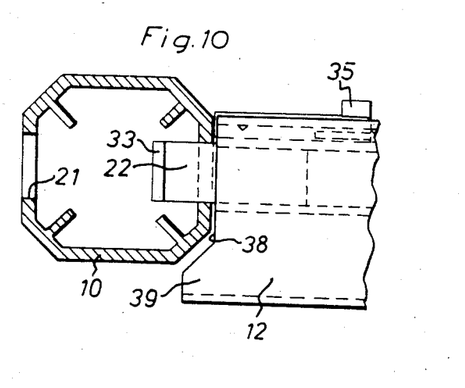
FIG. 10 is a horizontal section of an upright and a lateral view of a connecting beam inserted therein.

At the ends of the cross-beams and connecting beams 11 and 12, respectively, a bevelled portion 38 is provided in the region of the locking hook 22 and the catch 35 to form a projecting supporting portion or protruberance 39 at the end of the beam 11 and the connecting beam 12, respectively. The bevelled portion 38 makes it possible to mount a connecting beam or a cross-beam between two uprights 10 which are spaced apart a predetermined distance. Upon mounting, the connecting beam 12 (or the beam 11) is placed on the side, as shown in FIG. 10 so that the flange 33 will be directed vertically and can be passed through the oval hole 21. After that, the beam is pushed towards the opposite upright for insertion of the corresponding locking hook thereinto. The beam is then swung into vertical position (FIG. 9) so that the protruberance 39 will be swung inwardly towards the upright and prevent displacement of the beam in the longitudinal direction. When the beam has taken this position, the catch 35 is pushed from its position shown in FIG. 10 into the position shown in FIG. 9 so that the catch will enter the upper end of the oval hole 21 in order to fix the beam in its vertical position.

Figure 11:
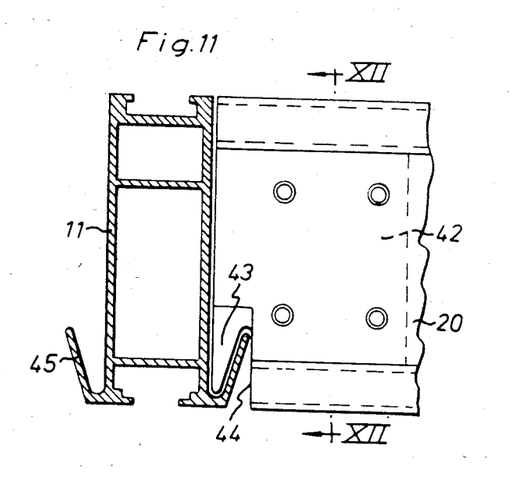
FIG. 11 is a section of a cross-beam comprised by the system and a lateral view of part of a lateral section-bar for a catwalk, hooked into the said cross-beam.
Figure 12:
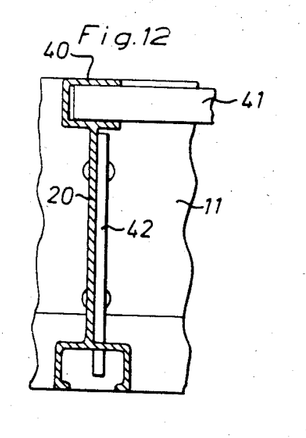
FIG. 12 is a section along line XII—XII in FIG. 11.
Figure 13:
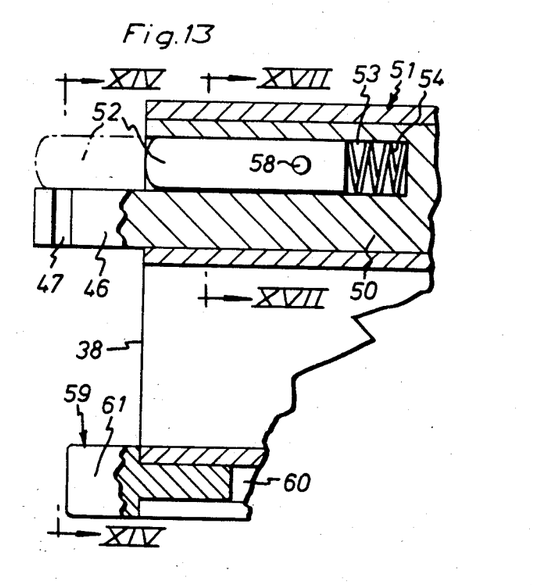
FIG. 13 is a section of an end portion of another embodiment of a connecting beam in the scaffolding system according to the invention.
Figure 14:
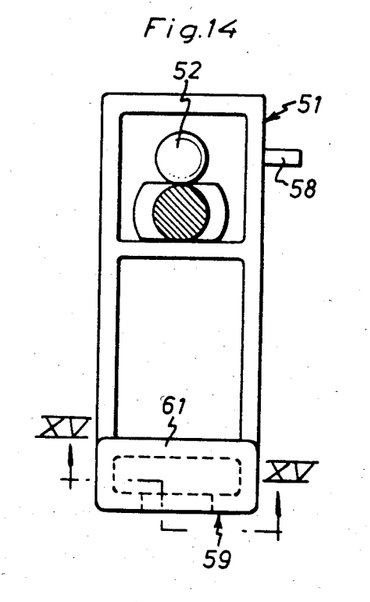
FIG. 14 is a section along line XIV—XIV in FIG. 13.
Figure 15:
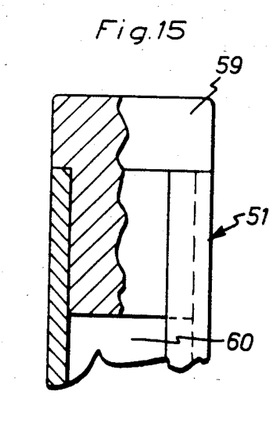
FIG. 15 is a section along line XV—XV in FIG. 14.

As will be evident from FIG. 1, a catwalk can be mounted in a simple manner in a scaffolding erected by utilising the system according to the invention. The catwalk and its construction are shown in detail in FIGS. 11 and 12. The catwalk 19 comprises the lateral section bars 20 which, at their upper ends, have a C-shaped portion 40 in which a grating or other flooring or latticework 41 has been inserted before mounting of the opposite lateral section bar 20. To facilitate mounting of said lateral section bars 20 these bars 20 are provided at their ends with an end fitting 42 having a hook 43. To expose the hook, a recess 44 has been formed at the lower end of the lateral section bar 20. The hook 43 is hooked into channels 45 at the lower ends of the cross-beams 11. If broad catwalks are needed, several gratings may be placed adjacent one another, and FIG. 1 shows two such gratings placed side by side.

Figure 16:
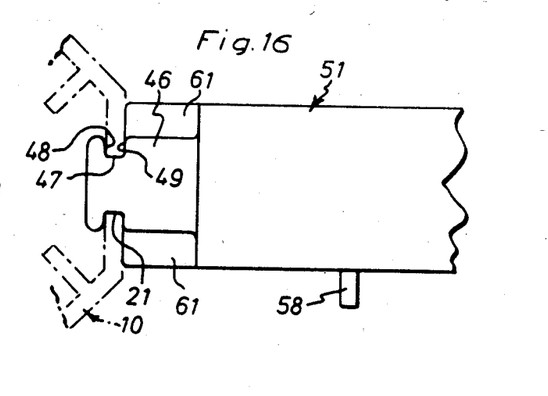
FIG. 16 is a top view of the connecting beam shown in FIG. 13 and indicates its position in the hole of an upright after mounting, but before the insertion of a catch.
Figure 17:
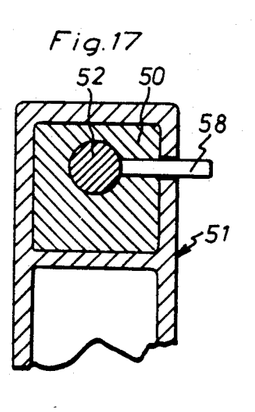
FIG. 17 is a section along line XVII—XVII in FIG. 13.
Figure 18:
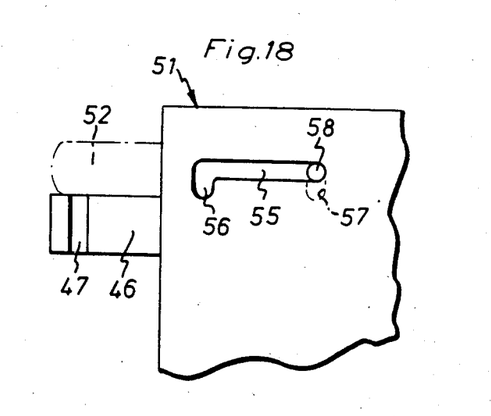
FIG. 18 shows the end portion of the connecting beam as seen from the right of FIG. 17.

FIGS. 13-18 show a preferred embodiment of a connecting beam in the scaffolding system according to the invention. The connecting beam illustrated is in the form of a longitudinal beam and may be compared to the stringer as shown in FIGS. 9 and 10. As will be evident from such comparison, the locking hook 46 distinguishes from the locking hook 22 in that the hook 46 has grooves 47 which are entered by the wall portion of the upright 10 adjacent the hole 21 so that the surface portions 48, 49 of the groove will engage the wall portion, and so that the locking hook 46, after it has been turned into bayonet engagement with the hole 21 cannot move either inwardly or outwardly relative to the wall of the upright. If furthermore, as is indicated in FIG. 16, the groove 47 is rounded or bevelled outwardly, the locking hook will be positively guided into correct position of alignment relative to the wall of the upright when the bayonet engagement is established by swinging the beam.

A further difference between the embodiment according to FIGS. 13-18 and the embodiment according to FIGS. 9 and 10 resides in that the mounting part 50 of the locking hook is large and enters an essentially square hole in the connecting beam 51. Above the locking hook 46, a catch 52 is inserted in a hole 53 in the mounting part 50. In the embodiment illustrated, the catch is biased by a compression spring 54 which, however, is not absolutely necessary. The compression spring strives to push the catch outwardly into the position shown by dash-dot lines. As will appear from FIGS. 17 and 18, the connecting beam 51 and the mounting part 50 are formed with an L-shaped, slot 55 which has one leg 56 pointing downwardly and which, if desired, may have also at its other end a downwardly directed portion 57 shown by dash-dot lines. The slot 55-57 serves to guide a pin 58 which, in some suitable manner, is rigidly connected with the catch 52. The catch is operated by means of this pin 58 and can be locked either in its position withdrawn into the mounting part and illustrated in the drawing or in its outer position shown by dash-dot lines, the pin 58 being pushed down into the slot portion 56. By placing the catch in a hole 53 directly in the mounting part of the locking hook, the catch can be made to move into direct contact with the locking hook so that the entire non-circular hole can be filled out upon mounting. This means that there will be no open gap as indicated between the locking hook 22 and the catch 35 in FIG. 9. The contact between the locking hook and the catch, when the non-circular hole is filled out, increases the stability of the scaffolding system in that no tilting can occur. To increase the wedging effect, the catch 52 can be formed with a slightly conical outward taper.

In the embodiment according to FIGS. 13-18 the supporting portion of the connecting beam has been formed differently from that shown in FIGS. 9 and 10. The supporting portion 39 in the embodiment according to FIGS. 9-10 has been replaced by a supporting shoulder 59 which is mounted in a downwardly open undercut channel 60 in the connecting beam 51. The supporting shoulder preferably has a head 61 of a width providing a large abutment surface against the upright. In the embodiment illustrated, the head 61 has the same width as the connecting beam 51. In other respects, the connecting beam as shown in FIGS. 13-18 is mounted in the same manner as the connecting beam 12 in FIGS. 9 and 10.

Figure 19:
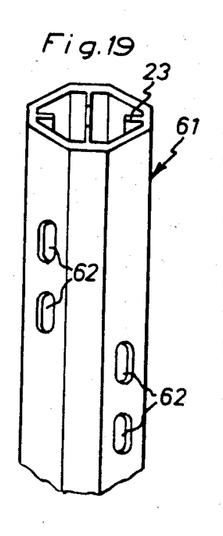
FIG. 19 shows an alternative embodiment of an upright in the system according to the invention.
Figure 20:
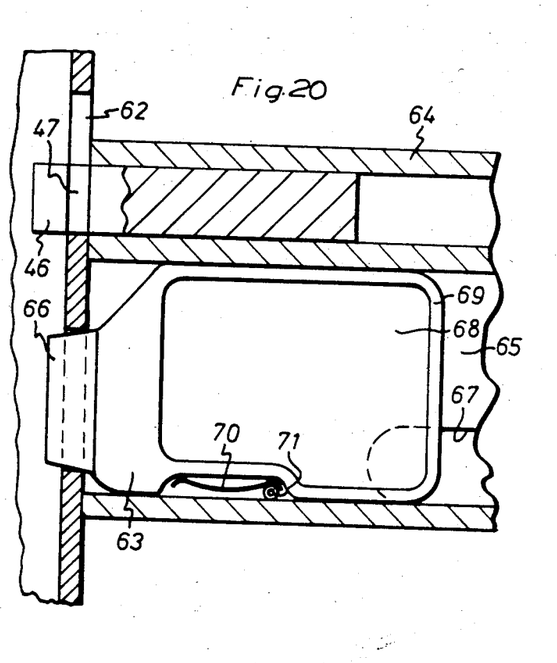
FIG. 20 is a further example of a connecting beam that can be used in the system according to the invention, when the upright according to FIG. 19 is used.

In the embodiment of the upright 10 which is shown in FIGS. 1-5, the non-circular holes 21 are spaced relatively widely apart longtudinally of the upright. The holes on one side are placed at a different level than the holes in the side of the upright perpendicular thereto, to, as will be clearly apparent from FIG. 1. In the embodiment according to FIG. 19, the holes 62 in the upright 10 have been doubled, each hole 62 resembling the hole 21. By doubling the holes 62 in this manner, a catch 63 can be used which is mounted in the lower and larger channel 65 of the connecting beam 64. The projecting locking part 66 of the catch is conical so that it can be guided into the lower one of the two doubled holes 62. In other respects, the connecting beam 64 is mounted in the same manner as in the embodiment previously described. To facilitate drawing in and withdrawal of the catch 63, one side of the connecting beam is formed with an elongate hole 67 so that the catch is accessible from outside. The catch has been formed with a central countersunk portion 68 having a circumferential flange 69. To facilitate locking of the catch 63 in its drawn-in and extended positions, a locking spring 70 is provided which is connected to the catch and follows the movements thereof, as well as a pin 71 which is rigidly connected to the connecting beam 64 and thus is stationary relative thereto. It also appears from the embodiment according to FIG. 20 that it is not necessary to provide one end of the connecting beam with a member corresponding to the supporting portion 39 or the shoulder 59.

As will appear from the above, the present invention provides an extremely rational scaffolding system which gives the scaffolding builder considerable freedom of choice and, furthermore, greatly simplifies the erection of the scaffolding. The longitudinal stiffening and guide flanges inside the uprights make it possible to use light-weight metals without jeopardising the slenderness ratio and the strength of the uprights. The flanges also provide for an advantageous guiding of jointing pieces and braces when these are inserted in the uprights, and furthermore there is sufficient room for the hooks of the fastening means which thus will not be in the way of the jointing pieces and braces. By designing the fastening means as bayonet joints with non-circular holes, and by using catches displaceably mounted on the cross-beams and longitudinal beams, the scaffolding can be erected without additional tools. To mount the ties 13, similar bayonet joints may be used for insertion in the non-circular holes in the uprights. Although the non-circular holes are oval in the embodiments of the present invention, other hole shapes are possible, for instance rectangular holes.

I claim:

1. A scaffolding system comprising spaced tubular uprights, jointing pieces insertable in said uprights, braces insertable in said upright, connecting beams and ties extending between said uprights, and fastening means for interconnecting said uprights and said connecting beams, characterized in that the uprights are in the form of tubes with non-circular openings in the wall thereof, said fastening means comprising locking hooks on said beams, said locking hooks being generally complementary in cross section to said non-circular openings and oriented such that said locking hooks are insertable in said openings and rotatable with said beams after insertion to engage the walls of the opposed uprights, each said beam including a supporting portion at each end thereof adapted to engage the upright in order to maintain the engagement after the beam and the locking hook have been rotated into engagement and inwardly projecting stiffening and guide flanges extending over the entire length of the uprights and adapted to guide said jointing pieces and said braces inserted in the tubes, while maintaining a spacing between the tube wall and any jointing pieces and braces inserted in the tube which is sufficient for accommodating that part of the locking hook which projects into the tube.

2. A scaffolding system as claimed in claim 1, including a catch which is displaceably mounted at the end of the connecting beam and is adapted, after the connecting beam and the upright have been interconnected, to be moved into locking engagement with said upright to prevent rotation of the connecting beam relative to the upright.

3. A scaffolding system as claimed in claim 2, characterized in that the holes of the upright comprise a hole portion for receiving the catch.

4. A scaffolding system comprising spaced tubular uprights, jointing pieces insertable in said uprights, braces insertable in said uprights, connecting beams and ties extending between said uprights, and fastening means for interconnecting said uprights and said connecting beams, characterized in that the uprights are in the form of tubes with holes in the wall thereof, said fastening means comprising locking hooks insertable in said openings, and inwardly projecting stiffening and guide flanges extending over the entire length of the uprights and adapted to guide said jointing pieces and said braces inserted in the tubes, while maintaining a spacing between the tube wall and any jointing pieces and braces inserted in the tube which is sufficient for accommodating that part of the locking hook which projects into the tube, said fastening means for interconnecting uprights and connecting beams being in the form of bayonet joints and each comprising one of the holes in the upright, the locking hook being secured to the end of the connecting beam and rotatable together therewith, and a catch which is displaceably mounted at the end of the connecting beam and is adapted, after the connecting beam and the upright have been interconnected, to be moved into locking engagement with said upright to prevent rotation of the connecting beam relative to the upright, said holes of the bayonet joints in the upright being non-circular, said holes of the upright comprising a hole portion for receiving the catch, said connecting beam having a portion, at least at one end, which is so formed that the locking hook can be moved further into the hole in the upright than is necessary for bayonet engagement when the bayonet joint is closed, said connecting beam having a supporting portion which is adapted to rest against the upright in order to maintain said engagement after the connecting beam and the locking hook have been rotated into engagement.

5. A scaffolding system as claimed in claim 4, characterized in that the supporting portion is in the form of a shoulder secured to the connecting beam and projecting from the end portion thereof.

6. A scaffolding system as claimed in claim 4, characterized in that the locking hook projecting from the connecting beam has shoulder surfaces for engaging the inner and outer sides of the wall portion of the uprights adjacent the holes of the bayonet joints.

7. A scaffolding system as claimed in any one of claim 1 and 4 characterized in that the uprights are in the form of a tube of polygonal, preferably octagonal cross-section.

* * * * *